United States Patent
Büsing

(10) Patent No.: US 8,512,482 B2
(45) Date of Patent: Aug. 20, 2013

(54) DEVICE FOR BLOCKING FLUID PASSAGE THROUGH A TUBULAR PART BY MEANS OF A CHECK VALVE, PARTICULARLY IN A HOUSEHOLD APPLIANCE

(75) Inventor: Johannes Büsing, Emersacker (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 907 days.

(21) Appl. No.: 12/532,656

(22) PCT Filed: Apr. 2, 2008

(86) PCT No.: PCT/EP2008/053921
§ 371 (c)(1),
(2), (4) Date: Sep. 23, 2009

(87) PCT Pub. No.: WO2008/125492
PCT Pub. Date: Oct. 23, 2008

(65) Prior Publication Data
US 2010/0037927 A1    Feb. 18, 2010

(30) Foreign Application Priority Data

Apr. 12, 2007  (DE) .......................... 10 2007 017 283

(51) Int. Cl.
*A47L 15/00*  (2006.01)
*F16K 15/00*  (2006.01)

(52) U.S. Cl.
USPC ........................................ 134/56 D; 137/511

(58) Field of Classification Search
CPC .................................................... F16L 25/10
See application file for complete search history.

(56) References Cited

U.S. PATENT DOCUMENTS

| 3,628,565 A | 12/1971 | McWethy et al. |
| 3,660,804 A * | 5/1972 | Bebber, Jr. .................... 439/578 |
| 3,814,124 A | 6/1974 | Bell |
| 4,967,790 A * | 11/1990 | Ganske ....................... 137/514.5 |
| 5,233,737 A * | 8/1993 | Policelli ........................ 285/390 |
| 5,364,244 A | 11/1994 | Taylor-McCune et al. |
| 6,089,272 A * | 7/2000 | Brand et al. .................. 137/859 |
| 6,668,858 B1 * | 12/2003 | Bazargan ...................... 137/559 |
| 2002/0083966 A1 | 7/2002 | Eiermann et al. |
| 2003/0029890 A1 * | 2/2003 | Olechowski et al. ......... 222/525 |
| 2004/0163689 A1 * | 8/2004 | Lee .............................. 134/94.1 |

FOREIGN PATENT DOCUMENTS

| CN | 2195017 Y | 4/1995 |
| DE | 3443166 A1 | 5/1986 |
| DE | 3715285 A1 | 11/1988 |

(Continued)

*Primary Examiner* — Michael Kornakov
*Assistant Examiner* — Marc Lorenzi
(74) *Attorney, Agent, or Firm* — James E. Howard; Andre Pallapies

(57) ABSTRACT

A tubular part is provided for a household appliance and includes a portion for operating with fluid. A check valve formed with an elastically compressible hollow cylindrical insertion body is inserted in the tubular part, which is configured as a receiving part and comprises a fluid passage and a contact region serving as a valve seat, the insertion body at the end thereof opposite the contact region of the fluid passage carrying a sealing element. Due to the insertion body being elastically compressed in the receiving part and thereby fixed in the axial position, the sealing element rests against the contact region such that fluid passage is possible only in the direction from the receiving part to the insertion body, while the opposite direction is substantially blocked.

20 Claims, 1 Drawing Sheet

(56) References Cited

FOREIGN PATENT DOCUMENTS

| | | |
|---|---|---|
| DE | 202005016282 U1 | 1/2006 |
| EP | 0854311 A2 | 7/1998 |
| EP | 0913119 A1 | 5/1999 |
| FR | 2371624 | 6/1978 |
| FR | 2372363 | 6/1978 |
| JP | 09-100924 A | 4/1997 |
| JP | 10-267143 A | 10/1998 |
| WO | WO 2006089604 A2 * | 8/2006 |

* cited by examiner

DEVICE FOR BLOCKING FLUID PASSAGE THROUGH A TUBULAR PART BY MEANS OF A CHECK VALVE, PARTICULARLY IN A HOUSEHOLD APPLIANCE

BACKGROUND OF THE INVENTION

Device for blocking passage of a fluid in a defined direction through a tubular part provided in particular in a household appliance operating with a fluid, through which part the fluid can be conducted in the direction opposite to the defined direction, the device comprising a check valve which has a sealing element and a contact region serving as a valve seat and formed in a fluid passage of the tubular part. The invention further relates to a household appliance which operates with a fluid and in particular to a dishwashing machine having a device as disclosed above.

Devices of the aforementioned type which are equipped with a check valve are employed in appliances operating with a fluid, in particular in household appliances, in order to enable a fluid to flow in only one fluid direction in a fluid passage containing the respective check valve. In the direction opposite to the flow direction in question, the respective check valve must meanwhile exert a sealing effect so that no fluid flow is possible in the corresponding opposite direction. This presupposes a precise matching fit of the respective sealing element at an associated contact region. It should be noted that what is to be understood by a fluid in this context is a liquid or a gas.

In a known device of the type considered hereintofore (DE 698 18 391 T2), a shunt check valve is provided in a shunt drain system of a dishwasher, said shunt check valve being located at an outlet of a pump chamber and being movable between a closed position and an open position in response to a pressure difference between its two sides. The shunt check valve in question consists of a carrier part formed by a pump chamber and having a drain conduit to which a tubular part of the shunt drain system is connected, and of a pivotable saucer-shaped valve element which is connected to said drain conduit and cooperates with a valve seat provided around the drain conduit in question to form a seal. However, this design requires an assembly technology for implementing the said shunt check valve which is sometimes considered undesirable. This is because the said valve element must be installed in the said drain conduit of the relatively voluminous and awkwardly shaped pump chamber, which is a labor-intensive task. Furthermore, the elements forming the shunt check valve must satisfy relatively high requirements in terms of accuracy of fit. The use of a device separate from the said pump chamber for forming a check valve is, however, not provided in the case of the known shunt drain system in question.

In order to block fluid passages in dishwashers it is also already known (DE 34 43 166 C2, DE 100 17 243 A1) to provide check valves (non-return valves) in the respective fluid passages, which valves in each case comprise a ball accommodated by a valve seat of a conduit and in sealing contact with its valve seat. By means of the check valves thus formed a fluid can then flow through the respective check valve in only one flow direction in each case; in the opposite direction thereto the respective check valve prevents a fluid flow. Because of the valve balls that are required in each case therein and that have to be ground with high precision, such check valves are sometimes regarded as too complicated and too expensive in manufacturing terms. There is therefore the desire to seal a tubular part through which a fluid is to be conducted so reliably by means of an easy-to-manufacture and easy-to-install check valve that a passage of fluid through the tubular part in question is made possible in only one flow direction, whereas it is reliably blocked in the opposite direction thereto.

BRIEF SUMMARY OF THE INVENTION

The object underlying the invention is therefore to disclose a way in which, in the case of a device of the type cited in the introduction and in the case of a household appliance containing said device, an easily implementable check valve is to be designed in order to seal off a tubular part in a reliable manner.

The aforementioned object is inventively achieved in the case of a device of the type cited in the introduction in that the tubular part is embodied as a receiving part for receiving an elastically compressible hollow cylindrical insertion body which carries the sealing element at its end situated opposite the contact region of the fluid passage, and in that the sealing element is in sealing contact with the insertion body elastically compressed in the receiving part and at the same time fixed in its axial position against the contact region in such a way that a passage of fluid is made possible only in the direction from the receiving part to the insertion body, while it is reliably blocked in the direction representing the opposite direction to the said defined direction.

It is preferably provided in this case that at its end opposite the contact region of the fluid passage the insertion body carries the sealing element in a pivotable manner. This arrangement permits even coarse bodies to pass through in the open state, since with this arrangement it is possible to open up 80% to 90% of the cross-section of the tubular part so that objects such as e.g. toothpicks can pass through unobstructed. However, other arrangements are also conceivable in which the sealing element is disposed to be movable along an axis.

The invention affords the advantage that by means of it a device that is particularly economical in terms of the material used and particularly easy to produce from the manufacturing viewpoint can be realized by means of a check valve with which the passage of fluid in the said receiving part can always be reliably sealed off. At the same time it is not necessary to age the passage member artificially, e.g. by tempering, in order to retain its sealing function permanently. Furthermore, the device according to the invention allows easy replacement of the insertion body with the sealing element in a particularly simple manner if the latter can no longer satisfactorily fulfill its sealing function e.g. as a result of wear and tear. In this case it is necessary to disassemble the no longer satisfactory insertion body with sealing element; this can be carried out in an advantageous manner without the use of tools, i.e. simply by manually compressing and withdrawing the insertion body in question together with the sealing element.

The invention further affords the advantage that in the region of its fluid passage the receiving part has only the contact region of the check valve serving as a valve seat and that the sealing element of the check valve in question is carried by the insertion body that is inserted into the receiving part and is fixed in the latter in such a way that it is elastically compressed in its axial direction. This enables the check valve to be realized using individual parts for which no special accuracies of fit are required. Moreover, even relatively large tolerances within a specific defined tolerance range, particularly in terms of the length of the insertion body and also in the length of the spacing between the receiving subregion surrounding the contact region of the receiving part serving as a valve seat and the fixing or, as the case may be, fixing position of the insertion body, can advantageously be fully compensated in the receiving part so that a check valve closing in a sealing manner is always available between the receiving part and the insertion body. With regard to the sealing element it should be noted that this can be attached with very precise tolerances on the insertion body in respect of its end situated opposite the contact region of the receiving part. The contact region of the receiving part can also be formed to precise tolerances in its depth, such that when the insertion body bears with its end having the sealing element for example against the region of the receiving part surrounding the contact region an excellent contact of the sealing surface of the sealing element on the said contact region can be achieved.

It is furthermore of advantage that the sealing element can be arranged in the insertion body in such a way that it is protected during transportation and installation. This means that the insertion body with its sealing element can be supplied without problems for installation as bulk material without the risk of the sealing element being damaged in the process.

The insertion body is beneficially fixed in the receiving part in its axial direction by means of a snap-fit connection arrangement. This affords the advantage of a particularly simple fixing of the insertion body in the receiving part.

The snap-fit connection arrangement in question is preferably formed in that in the receiving part there is provided at least one receiving groove region into which the insertion body is engaged by means of a corresponding snap-fit latch part. This constitutes a particularly simple snap-fit connection arrangement. However, it is also possible to provide the respective receiving groove region in the insertion body and the respective snap-fit latch part in the receiving part.

Other simple snap-fit connection arrangements are produced according to a further beneficial embodiment of the present invention on the one hand as a result of the fact that the receiving groove region is provided as a closed groove in the inner circumference of the receiving part and that the snap-fit latch part is formed by means of a preferably circumferential snap-fit latch carried by the outer circumference of the insertion body, and on the other hand as a result of the fact that as an alternative thereto the receiving groove is formed as a closed groove in the outer circumference of the insertion body groove and that the snap-fit latch part is formed by means of a preferably circumferential snap-fit latch carried by the inner circumference of the receiving part.

According to yet another beneficial embodiment of the present invention, the elastically compressible hollow cylindrical insertion body is formed by means of an elastically compressible hollow cylindrical compression body having, in its axial direction, transverse slots provided spaced apart from one another and running offset with respect to one another transversely to the longitudinal direction of the compression body. This produces the advantage that the insertion body in question can be formed by means of a particularly easy-to-manufacture compression body, at one end of which the sealing element of the said check valve can be easily attached.

In the beneficial embodiment of the present invention considered above, transverse slots immediately adjacent to one another are preferably offset from one another in the longitudinal direction of the compression body in the elastically compressible hollow cylindrical compression body. In this way a particularly effective compressibility is ensured in terms of the elasticity of the compression body in its axial direction. In this arrangement transverse slots immediately adjacent to one another preferably overlap in their longitudinal direction.

In the region of the snap-fit connection arrangement the compression body beneficially has at least one longitudinal slot running in the axial direction of the compression body. However, a plurality of such longitudinal slots are preferably provided, and beneficially even in pairs. Each of these beneficial developments of the present invention produces the advantage that the compression body is easily elastically compressible in its radial direction in the region of the snap-fit connection arrangement, such that the snap-fit connection arrangement in question is easy to manufacture.

It is also of advantage in the case of the last considered beneficial development of the present invention if the respective longitudinal slot is open toward the end of the compression body opposite the end of the compression body containing the sealing element. In this case the compression body end region in question can be elastically compressed particularly easily in the radial direction.

According to yet another beneficial embodiment of the invention, it is of quite particular advantage if the sealing element is embodied as saucer-shaped and bears against an at least approximately round contact region of the receiving part. In this case the sealing element preferably consists of a soft-elastic material, such as a soft-elastic plastic, and the receiving part preferably consists of a hard or viscoplastic material, such as a hard or viscoplastic plastic, against which or against whose contact region the sealing part in question is in sealing contact. In this way a check valve that is particularly effective in terms of its sealing function can be realized using individual parts for which no excessively great accuracies of fit are required.

A device according to the present invention is beneficially contained in a household appliance, and more specifically in particular in a dishwasher and preferably in what is termed its pump well region.

BRIEF DESCRIPTION OF THE DRAWINGS

The invention is explained in more detail below by way of example with reference to a drawing, in which.

DETAILED DESCRIPTION OF EXEMPLARY EMBODIMENTS OF THE PRESENT INVENTION

The device according to an exemplary embodiment of the invention, of which a part is shown in a sectional view in each case in FIGS. 1 and 2, serves to block the passage of a fluid in a defined direction through a tubular part provided in particular in a household appliance operating with a fluid, said part being formed by means of a receiving part AT for receiving an insertion body EK which is to be considered in more detail below. By means of said receiving part AT, which may consist of shape-stable material such as a metal or a hard or viscoplastic plastic, it is aimed to be made possible for a fluid to be conducted through in the direction indicated by an arrow PF entered in each case in FIGS. 1 and 2, whereas a passage of fluid in the direction opposite thereto shall be, and also is, reliably blocked. At the same time the device in the open state also permits coarse bodies to pass through, since approx. 80% to 90% of the cross-section of the tubular part is released in the open state when the device is used e.g. in a dishwasher.

The receiving part AT can be formed in particular by means of a discharge stub of a drain pump in a household appliance, and more specifically in particular in a dishwasher. The receiving part AT in question is formed in this case by means of a receiving sleeve embodied essentially in a cylinder shape and having, in its part shown on the right in each case in FIGS. 1 and 2, a projecting contact region AB for bearing a sealing element DG accommodated in the insertion body EK and forming a check valve together with the contact region AB in question. The sealing element DG is preferably embodied as a saucer-shaped flat pivoting part or as a flap having a circular sealing region with which it bears against the contact region AB of the receiving part AT possessing a corresponding circularity or an at least approximately round contact shape, after—as will become clear in the following—the insertion body EK is inserted into the receiving part AT as the only part preassembled with the sealing element and fixed in its axial position with respect to the receiving part. After being inserted into the receiving part AT the insertion body EK bears with its end carrying the sealing element DG against a region surrounding the contact region AB of the receiving part AT, as can be seen from FIGS. 1 and 2. By means of radially protruding body parts, so-called domes DO, provided in the region of the sealing element DG the insertion body EK with its sealing element DG can be centered exactly in the receiving part AT.

Figure 1:
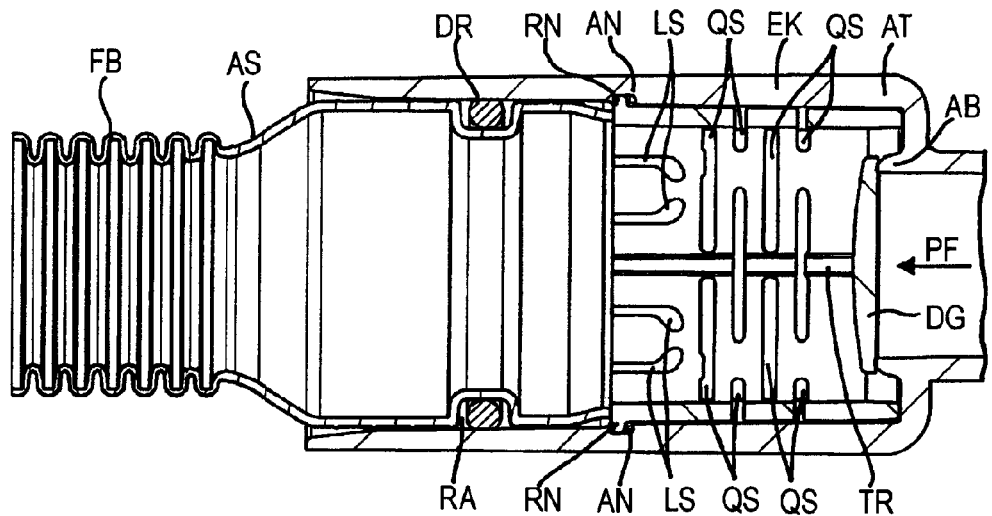
FIG. 1 shows part of a device according to a preferred exemplary embodiment of the present invention in a sectional view.
Figure 2:
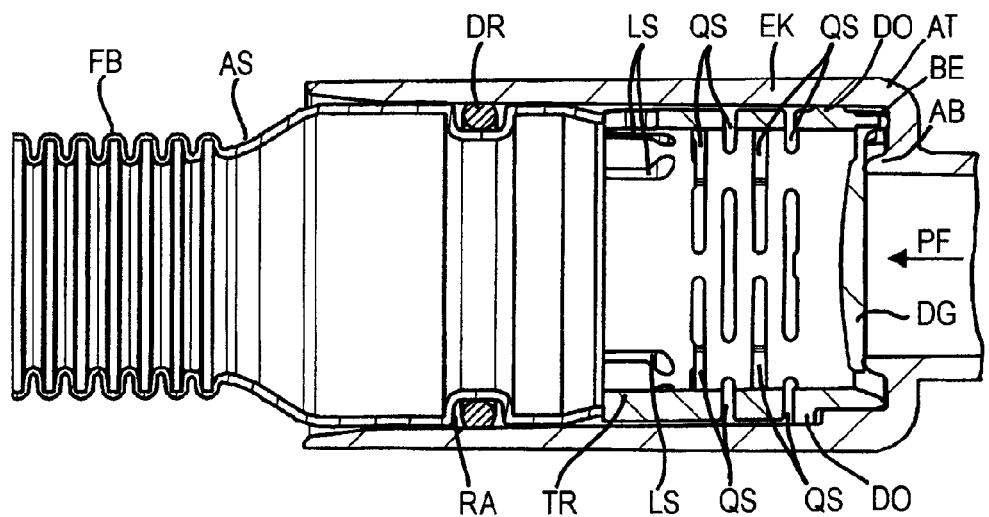
FIG. 2 shows the device depicted in FIG. 1 after it has been rotated through 90° about its longitudinal axis.

The insertion body EK, which is an elastically compressible hollow cylindrical insertion body EK which carries the sealing element DG in a pivotable or hinged manner at or in its end facing toward the said contact region AB of the carrying body TK, is inserted—as can be seen from FIGS. 1 and 2—into the receiving part AT from its left end. The sealing element DG, which at the same time is accommodated in a protected manner with its pivoting part in the interior of the insertion body EK, preferably consists of a soft-elastic material, such as e.g. liquid silicone, TPE or rubber. The insertion body EK, in contrast, consists of a harder or tough material, such as a viscoplastic plastic.

In this case, as can be seen in more detail in FIG. 2, the sealing element DG is fixedly attached with its pivoting part or, as the case may be, its valve flap to a relatively narrow fixing region BE of the insertion body EK, for example by integral molding or by means of an adhesive bond. Moreover, the sealing element can be attached to the insertion body EK using a two-component injection method or using what is called transfer or insertion technology. The connection, which is achievable with a very accurate assembly tolerance, between the sealing element DG and the insertion body EK is in this case preferably configured in such a way that the sealing element DG is accommodated with its pivoting part in the insertion body EK without pre-tension, i.e. runs in the insertion body EK vertically with respect to its longitudinal axis. It is, however, also possible to provide the pivoting part of the sealing element DG with a pre-tension that is directed away from the insertion body EK. Said pre-tension then defines a higher pressure compared to the use of a sealing element DG provided without tension, as of which pressure the check valve consisting of the contact region AB of the carrying body TK and the sealing element DG is opened as a result of a fluid flow in the direction of the arrow PF.

The elastically compressible hollow cylindrical insertion body EK is formed in the present case by means of an elastically compressible hollow cylindrical compression body EK which, as is apparent from FIGS. 1 and 2, is provided in its axial direction with transverse slots QS provided spaced apart from one another and running offset with respect to one another. Of these transverse slots QS, which in the case of an insertion body outer diameter of approx. 30 mm and a wall thickness of approx. 2 mm can each have a length of e.g. 10 to 30 mm and a width between 1 and 2 mm and a mutual spacing of 1 to 2 mm in the longitudinal direction of the compression body EK, in particular immediately adjacent transverse slots QS in the compression body in question are offset in such a way that they are provided partially overlapping in their lengths. As a result of this arrangement of the transverse slots QS the insertion or compression body EK possesses a cage-like appearance, for which reason it can also be described as a cage body.

The aforementioned transverse slots QS enable the insertion or compression body EK to be elastically compressible in its axial direction. This elastic compressibility is exploited here, as explained in the introduction, to achieve a full tolerance compensation of different lengths of compression bodies lying within a specific defined tolerance range and spacings of different lengths between the receiving part region surrounding the contact region of a respective receiving part serving in each case as a valve seat, against which receiving part region the respective insertion body EK is in contact with its one (right-hand) end, and the fixing or, as the case may be, fixing position at the other (left-hand) end of the respective insertion body in the respective receiving part. As a result a check valve closing in a sealing manner is available at all times between the respective receiving part AT and the respective insertion body EK, in which check valve the position of the sealing element DG provided on the insertion body EK is specified in a defined manner in relation to the contact region AB of the contact part AT. The compressive force of the insertion body remaining in each case after said insertion body has been elastically compressed presses the sealing element securely against the contact region of the receiving part.

In its elastically compressed state in the axial longitudinal direction the insertion body EK carrying the sealing element DG is fixed in the receiving part AT in such a way that the sealing element DG is permanently in contact in a sealing manner with the contact region AB of the receiving part AT. In this case a snap-fit connection arrangement, which according to FIG. 1 is formed from two diametrically opposing snap-fit latch parts RN on the outer circumference of the left-hand end of the insertion or compression body EK and from receiving groove regions AN matching these in the inner circumference of the receiving part AT serves for said fixing of the insertion body EK in the receiving part AT. Moreover, the said compressing of the insertion or compression body EK in its axial direction permits the previously described tolerance compensation to be achieved at a desired engagement stroke in which the insertion or compression body EK has to be compressed to accomplish engagement. In order to assist the engagement of the snap-fit latch parts RN in the receiving groove regions AN by means of a slight compressibility of the relevant end of the insertion body EK, at least one longitudinal slot LS is formed in said end region of the insertion body EK; preferably, however, as is apparent from FIGS. 1 and 2, longitudinal slots LS provided in pairs are formed which are open in the just considered end region of the insertion body EK and from which the longitudinal slots belonging in each case to a pair of immediately adjacent longitudinal slots LS are formed running toward each other with their other ends. This results in a particularly favorable elastic deformability of the considered end region of the insertion or compression body EK during the engagement of the snap-fit connection arrangement.

It should additionally be remarked with reference to the insertion or compression body EK that in its axial direction the latter has a narrow supporting or stabilizing rib TR standing proud of its inner surface. Said narrow supporting or stabilizing rib TR is formed diametrically opposite the fixing region BE of the sealing element DG on the insertion body EK; by means of said rib the insertion or compression body EK is endowed with a particularly good shape stability for the sealing contact of the sealing element DG against the contact region AB of the receiving part AT. In addition the supporting or stabilizing rib TR in question serves to facilitate manual withdrawal of the insertion or compression body EK from the receiving part AT by applying pressure to the supporting or stabilizing rib TR using a finger.

Also shown in extract form in the left part of FIGS. 1 and 2 is a connecting hose part AS of what is termed a corrugated or flexible hose which, without the use of a sleeve socket or similar adapter element, is inserted directly in connection with the insertion body EK into the tubular receiving part AT and is clamped tight in a leakproof manner in the latter by means of a sealing ring DR. Thus, the receiving part AT thereby accommodates in a resource-saving manner both the insertion or compression body EK and the connecting hose part AS, without further fixing elements such as e.g. collars or washers being required for securing them in place. In the present case the sealing ring DR, which can consist of a soft-elastic material such as rubber or plastic, is accommodated by a ring receiving groove RA in the circumference of the connecting hose part AS; it is compressed after the insertion of the connecting hose part AS into the carrying body TR. The connecting hose part AS can itself be a plastic part, at whose end (shown on the left in FIGS. 1 and 2) a gaiter region FB is provided which allows a relatively flexible connection of the connecting hose part AS to a connecting or discharge pipe (not shown) arranged in a fixed manner.

The device according to the present invention has been explained in the foregoing with reference to a preferred exemplary embodiment. It should, however, be understood that the present invention is not limited to the embodiment variant shown in FIGS. 1 and 2, but can be modified in myriad ways. Thus, for example, the elastically compressible hollow cylindrical insertion body EK can be formed by means of a different insertion body from the above-considered cage-shaped compression body, for example by means of a sponge-like plastic insertion body exhibiting inherent elasticity and having no slots. The snap-fit connection arrangement, too, can be realized at a different position along the insertion body EK and/or in a different manner than has been explained with reference to FIG. 1. Thus, the snap-fit latch parts RN can be provided on the inner circumference of the receiving part AT and the receiving groove regions AN in the outer circumference of the insertion body EK. Furthermore, the snap-fit connection arrangement can be formed, for example, by a closed groove being provided in the inner circumference of the receiving part AT and by the snap-fit latch region being formed by a preferably circumferential snap-fit latch carried by the outer circumference of the insertion body EK. Alternatively thereto, however, it is also possible for the receiving groove to be formed in the outer circumference of the insertion body EK as a closed circumferential groove and for the snap-fit latch region to be formed by a preferably circumferential snap-fit latch carried by the inner circumference of the receiving part AT.

The end of the insertion body EK situated on the right in FIGS. 1 and 2 in the receiving part AT can also be specified differently than described. Thus, for example, separate contact elements protruding radially away from the insertion body EK and the receiving part AT and aligned for contact with one another in the assembled state of the device can be provided in order to define the position of the sealing element DG provided on the insertion body EK in relation to the contact region AB of the receiving part AT in the desired fashion.

In conclusion it should additionally be remarked that the device according to the present invention is not only applicable in the case of a household appliance, and specifically in particular in the case of a dishwasher, but generally for sealing a tubular part through which a fluid (liquid or gas) can be conducted in order to enable a fluid to flow through the tubular part in only one flow direction by means of the check valve formed between the receiving part AT and the insertion body EK, while blocking said flow in the direction opposite thereto.

LIST OF REFERENCE SIGNS

AB Contact region
AN Receiving groove region
AS Connecting hose part
AT Receiving part
BE Fixing region
DG Sealing element
DO Dome
DR Sealing ring
EK Insertion body, compression body
FB Gaiter region
LS Longitudinal slots
PF Arrow
QS Transverse slots
RA Ring-receiving groove
RN Snap-fit latch part
TR Supporting or stabilizing rib

The invention claimed is:

1. A device for blocking passage of fluid in a household appliance, the device comprising:
   a tubular element including a receiving portion configured for flow of fluid therethrough;
   a substantially hollow tubular insertion body configured for receipt in the receiving portion of the tubular element;
   a check valve having a sealing element and a contact region configured as a valve seat and formed in the tubular element, the sealing element being disposable against the valve seat in a sealing position for blocking passage of fluid in a first direction from the tubular insertion body to the receiving portion of the tubular element and being displaceable from its sealing position against the valve seat to an open position for allowing passage of fluid in a second direction that is opposite the first direction the tubular insertion body supporting the sealing element at an end thereof disposed adjacent the contact region of the check valve, at least a portion of the tubular insertion body comprising a soft-elastic material and being elastically deformable such that the tubular insertion body is, in an installed position in the receiving portion of the tubular element, elastically deformed and fixed in an axial position relative to the tubular element with the sealing element bearing against the contact region in a sealing manner,
   wherein the sealing element is attached at a pivoting end to the insertion body in a pivotable manner such that the sealing element pivots between the sealing position and the open position, and
   the sealing element has a free end opposite the pivoting end, the free end moving away from the contact region as the sealing element moves from the sealing position to the open position.

2. The device according to claim 1 and further comprising a snap-fit connection arrangement for fixing the tubular insertion body in its axial direction in the receiving portion.

3. The device according to claim 2, wherein the snap-fit connection arrangement includes at least one snap-fit latch part operatively associated with the tubular insertion body and at least one wall formed in the receiving portion defining a groove region for receiving engagement with the at least one snap-fit latch part.

4. The device according to claim 2, wherein the snap-fit connection arrangement includes at least one snap-fit latch part operatively associated with the receiving portion and at least one wall formed in the tubular insertion body defining a groove region for receiving engagement with the at least one snap-fit latch part.

5. The device according to claim 3, wherein the groove region is formed as a closed groove in the inner circumference of the receiving portion and the snap-fit connection latch part is operatively associated with the outer circumference of the tubular insertion body.

6. The device according to claim 4, wherein the groove region is formed as a closed groove in the outer circumference of the tubular insertion body and the snap-fit connection arrangement includes a snap-fit latch part operatively associated with the inner circumference of the receiving portion.

7. The device according to claim 1, wherein the tubular insertion body is configured as an elastically compressible, substantially hollow, cylindrical compression body formed with transverse slots along a longitudinal direction thereof, the transverse slots being spaced apart from one another and extending in an offset manner with respect to one another transversely with the longitudinal direction of the compression body.

8. The device according to claim 7, wherein transverse slots immediately adjacent to one another in the longitudinal direction of the compression body are offset from one another along the compression body.

9. The device as according to claim 2, wherein the compression body is formed with at least one longitudinally extending slot in a region of the snap-fit connection arrangement.

10. The device according to claim 9, wherein the longitudinal slot is open toward an end of the compression body opposite the end of the compression body containing the sealing element.

11. The device according to claim 1, wherein the sealing element is configured as a saucer-shaped member and the contact region is a substantially circular contact region formed on the receiving portion.

12. The device according to claim 1, wherein the sealing element is formed from an elastic material and the contact region is formed from at least one of a plastic material and a viscoplastic material.

13. A household appliance configured for operating with fluid having a device for blocking passage of fluid in a first direction through a tubular element provided in the household appliance through which tubular element fluid can be passed in a second direction, the second direction being opposite to the first direction, the device for blocking passage of fluid in a first direction including a check valve having a sealing element for operative prevention of fluid flow through the check valve, wherein the sealing element can be moved between a closed condition for passage of fluid in the first direction and an open condition for allowing passage of fluid in the second direction, the check valve including a contact region configured as a valve seat and formed in the tubular element, the household appliance comprising a substantially hollow, cylindrical insertion body configured for receipt in a receiving portion of the tubular element, the insertion body being configured to operationally accommodate the sealing element at an end thereof disposed adjacent the contact region of the check valve, at least a portion of the insertion body comprising a soft-elastic material and being elastically deformable, thereby with the insertion body elastically deformed in the receiving portion and fixed in an axial position, in the closed condition the sealing element bears against the contact region in a sealing manner wherein passage of fluid is blocked in a direction from the insertion body to the receiving portion, corresponding to the first direction and, in the open condition the sealing element does not bear against the contact region and passage of fluid is not blocked in a direction from the receiving portion to the insertion body, corresponding to the second direction, wherein the sealing element is attached at a pivoting end to the cylindrical insertion body in a pivotable manner such that the sealing element pivots between the closed condition and the open condition, and the sealing element has a free end opposite the pivoting end, the free end moving away from the contact region as the sealing element moves from the closed condition to the open condition.

14. The household appliance according to claim 13, wherein when the sealing element is in the open condition, the fluid flows unobstructed along a central axis of the tubular element.

15. The household appliance according to claim 13 and further comprising a snap-fit connection arrangement for fixing the cylindrical insertion body in its axial direction in the receiving portion.

16. The household appliance according to claim 15, wherein the snap-fit connection arrangement includes at least one snap-fit latch part operatively associated with the cylindrical insertion body and at least one wall formed in the receiving portion defining a groove region for receiving engagement with the at least one snap-fit latch part.

17. The household appliance according to claim 15, wherein the snap-fit connection arrangement includes at least one snap-fit latch part operatively associated with the receiving portion and at least one wall formed in the cylindrical insertion body defining a groove region for receiving engagement with the at least one snap-fit latch part.

18. The household appliance according to claim 13, wherein the cylindrical insertion body is configured as an elastically compressible, hollow, cylindrical compression body formed with transverse slots along a longitudinal direction thereof, the transverse slots being spaced apart from one another and extending in an offset manner with respect to one another transversely with the longitudinal direction of the compression body.

19. The household appliance according to claim 13, wherein the sealing element is configured as a saucer-shaped member and the contact region is a substantially circular contact region formed on the receiving portion.

20. The device according to claim 1, wherein when the sealing element is in the open position, the fluid flows unobstructed along a central axis of the tubular element.

* * * * *

UNITED STATES PATENT AND TRADEMARK OFFICE
CERTIFICATE OF CORRECTION

PATENT NO.        : 8,512,482 B2                                                        Page 1 of 1
APPLICATION NO.   : 12/532656
DATED             : August 20, 2013
INVENTOR(S)       : Johannes Büsing It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Fifteenth Day of September, 2015

Michelle K. Lee
*Director of the United States Patent and Trademark Office*